July 28, 1970
C. L. CARTER
3,521,908
SELF-ALIGNING TRAILER HITCH
Filed March 21, 1969
2 Sheets-Sheet 1
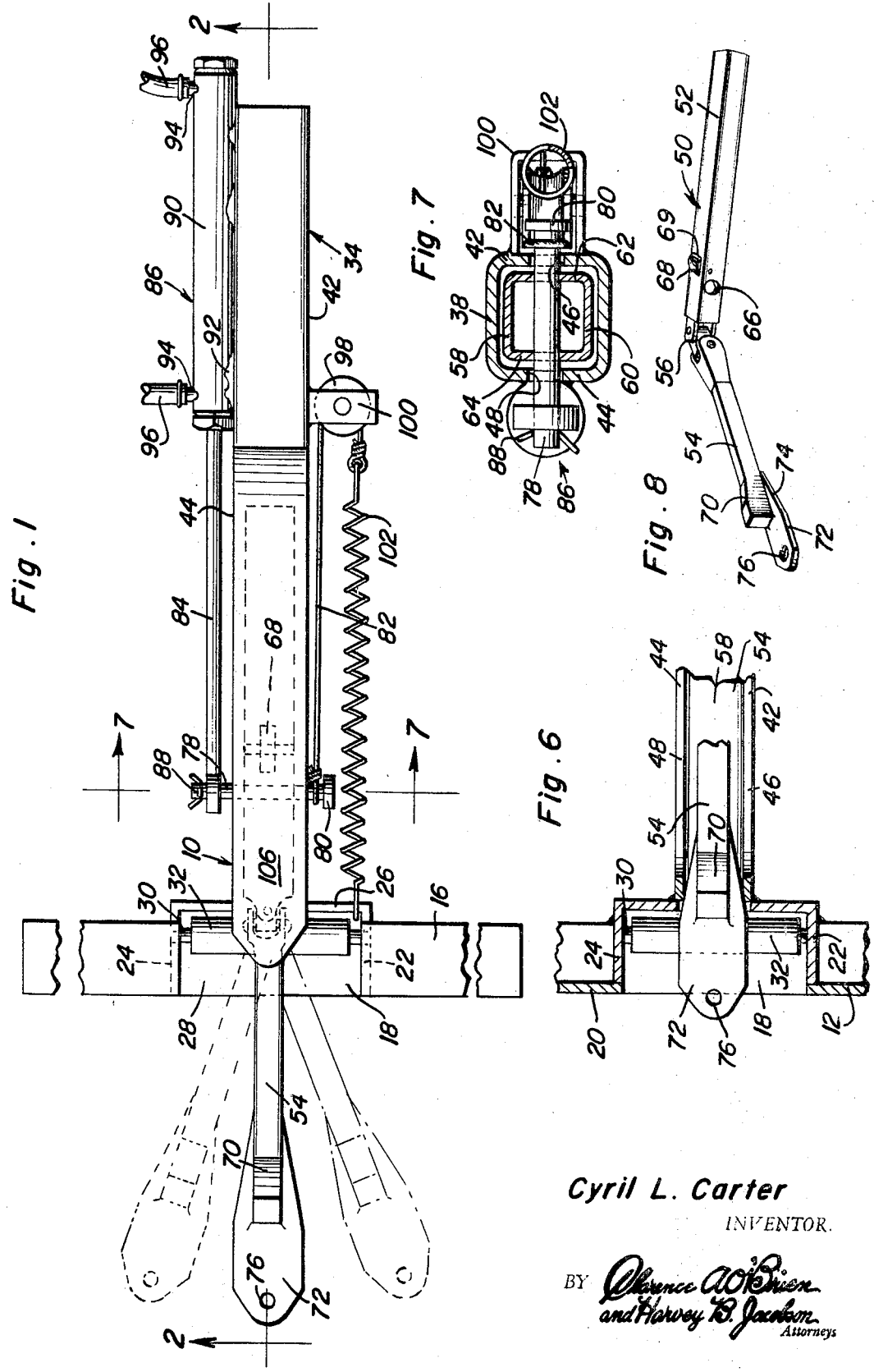
Cyril L. Carter
INVENTOR.
BY Clarence A. O'Brien
and Harvey B. Jackson
Attorneys July 28, 1970   C. L. CARTER   3,521,908
SELF-ALIGNING TRAILER HITCH
Filed March 21, 1969   2 Sheets-Sheet 2
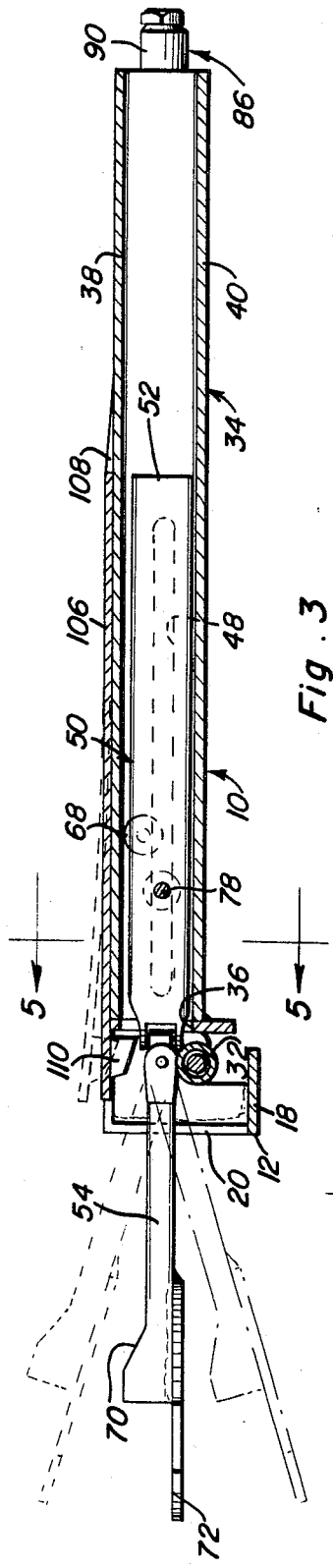
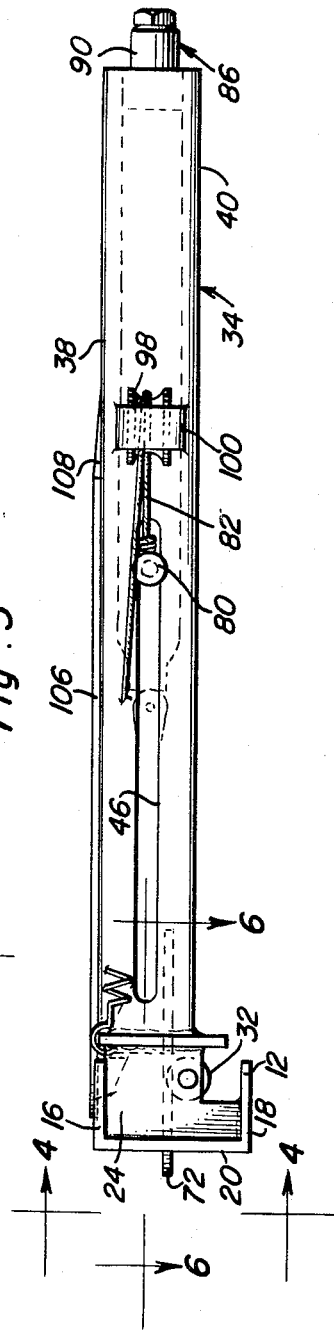
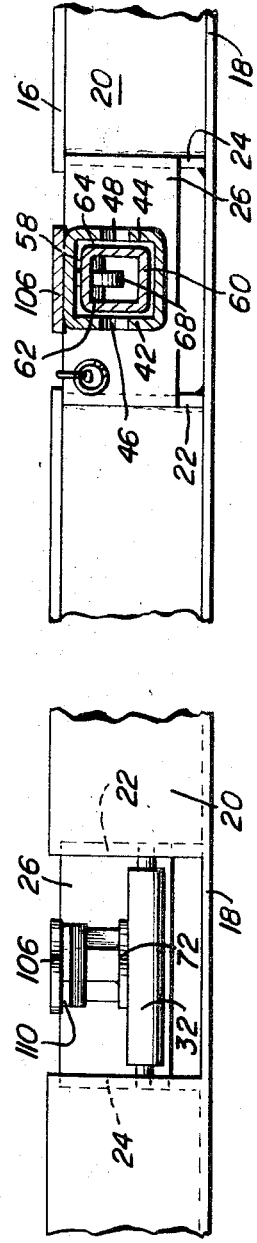
Cyril L. Carter
INVENTOR.

United States Patent Office 3,521,908
Patented July 28, 1970

3,521,908
SELF-ALIGNING TRAILER HITCH
Cyril L. Carter, Box 72A1, Rte. 1,
Scottsbluff, Nebr. 69361
Filed Mar. 21, 1969, Ser. No. 809,088
Int. Cl. B62d 53/00
U.S. Cl. 280—479
11 Claims

ABSTRACT OF THE DISCLOSURE

A tubular guide for support, in longitudinal disposition, from a towing vehicle with one end opening outwardly of the rear end of the vehicle. An elongated tension member including rigid front and rear sections swivelly joined together at adjacent ends is slidable longitudinally within the guide between a forward position with the rear section projecting only slightly rearwardly from the guide and guided against lateral movement in all directions and a rearward position with at least all but the forward terminal end of the rear section projecting rearwardly from the guide for at least limited lateral movement in all directions relative to the guide.

---

The trailer hitch of the instant invention has been designed to provide a means whereby a towing vehicle coupled to a trailer or other vehicle to be towed need not be precisely positioned immediately forwardly of the trailer or vehicle to be towed in order that the vehicle to be towed may be coupled to the towing vehicle. The trailer hitch includes a rearwardly extendible portion which, when rearwardly extended, may be shifted laterally in both horizontal and vertical directions for coupling to a vehicle to be towed. The hitch further includes means whereby the rearwardly extendible portion may be driven forwardly to its operative position flush with the rear end of the vehicle to which the hitch is secured and the hitch and the rearwardly extendible portion include coacting cam surfaces whereby the rear end of the rearwardly extendible portion will automatically be cammed into proper position and retained against lateral movement upon forward shifting of the rearwardly extendible portion from a rearwardly disposed position to its full forward operative position.

The main object of this invention is to provide a wide range trailer or tow hitch which may be conveniently supported from a towing vehicle and utilized to operatively couple a trailer or other vehicle to be towed to the towing vehicle without the necessity of properly positioning the towing vehicle and the vehicle to be towed relative to each other immediately before coupling the trailer to the towing vehicle.

Another object of this invention, in accordance with the immediately preceding object, is to provide a wide range tow hitch including motor means for shifting the hitch element toward a properly centered position relative to the towing vehicle after the vehicle to be towed has been coupled to the hitch element without the necessity of operating the towing vehicle in either forward or reverse directions.

Still another object of this invention is to provide a wide range tow hitch in accordance with the preceding objects and constructed in a manner whereby it may be readily secured to various types of towing vehicles.

A final object of this invention to be specifically enumerated herein is to provide a wide range trailer hitch in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the trailer hitch with alternate positions of the hitch element thereof illustrated in phantom lines;

FIG. 2 is a longitudinal vertical sectional view taken substantially upon the plane indicated by the section line 2—2 of FIG. 1 and with further alternate positions of the hitch element illustrated in phantom lines;

FIG. 3 is a side elevational view of the assemblage illustrated in FIG. 2 but with the hitch element portion in a fully retracted towing position;

FIG. 4 is a fragmentary end elevational view taken substantially upon the plane indicated by the section line 4—4 of FIG. 3;

FIG. 5 is a fragmentary transverse vertical sectional view taken substantially upon the plane indicated by the section line 5—5 of FIG. 2;

FIG. 6 is a fragmentary horizontal sectional view taken substantially upon the plane indicated by the section line 6—6 of FIG. 3;

FIG. 7 is an enlarged transverse vertical sectional view taken substantially upon the plane indicated by the section line 7—7 of FIG. 1; and FIG. 8 is a perspective view of the articulated tension member portion of the hitch whose rear end defines the hitch element of the hitch.

Referring now more specifically to the drawings, the numeral 10 generally designates the hitch of the instant invention. The hitch 10 includes a horizontally disposed rear bumper defining channel member 12 including upper and lower forwardly directed flanges 16 and 18 interconnected by a rear upstanding web 20. The center portion of the channel 12 is interrupted and includes a pair of upstanding plates 22 and 24 secured between the flanges 16 and 18 and the web 20 and projecting slightly forwardly of the forward ends of the flanges 16 and 18. The forward vertical edges of the plates 22 are interconnected by means of a forward wall 26 secured therebetween and the plates 22 and 24 as well as the wall 26 and the central portion of the lower flange 18 define a rearwardly and upwardly opening recess 28.

A support shaft 30 extends between and has its opposite ends secured through the plates 22 and 24 and a roller 32 is journalled on the shaft 30. In addition, a tubular guide referred to in general by the reference numeral 34 is provided and projects forwardly from the wall 26. The rear end of the tubular guide 34 is secured about an opening 38 formed in the wall 26 in any convenient manner such as by welding and the tubular guide 34 is generally square in cross-sectional shape and includes upper and lower walls 38 and 40 interconnected by means of opposite side walls 42 and 44 longitudinally slotted as at 46 and 48. The slots 46 and 48 are registered and an elongated tension member referred to in general by the reference numeral 50 is provided and longitudinally slidable in the tubular guide 34.

The tension member 50 includes rigid front and rear ends 52 and 54 which are rod-like in configuration and have their rear and front ends interconnected by means of a universal joint 56. The front and rear ends are generally square in cross-sectional shape and have outside dimensions slightly less than the inside dimensions of the tubular guide 34. The front end 52 is tubular in configuration and includes top and bottom walls 58 and 60 interconnected by means of side walls 62 and 64. The side walls 62 and 64 are provided with aligned transverse bores 66 and a roller member 68 is journalled in an opening 69 provided therefor in the rear end of the top wall 58.

The rear end of the rear end or section 54 includes a rearwardly and upwardly inclined cam surface 70 and a plate-like hitch element 72 is secured to the undersurface of the rear end 54 in any convenient manner. The hitch element 52 includes opposite side rearwardly divergent cam surfaces 74 and projects rearwardly of the rear end 54 and is apertured as at 76 whereby a vehicle or trailer to be towed may be operatively coupled to the hitch element 72.

A transverse shaft is secured through the bore 66 and has its opposite ends projecting through the slots 46 and 48. The shaft is designated by the reference numeral 78 and has a head 80 on one end spaced outwardly from the side wall 42 and a free end portion projecting outwardly of the side wall 44. One en of an elongated flexible tension member 82 is secured to the headed end of the transverse shaft 78 outwardly of the side wall 42 and the free end of the piston rod portion 84 of a fluid motor referred to in general by the reference numeral 86 is secured on the other end of the shaft 78 by means of a cotter pin 88. The cylinder portion 90 of the fluid motor 86 is secured to the outer surface of the side wall 44 in any convenient manner such as by welding 92 and is provided with two fluid inlets and outlets 94 to which corresponding ends of a pair of fluid lines 96 are secured. The ends of the lines 96 remote from the fittings 94 may be operatively connected to any suitable fluid reservoir and source of fluid under pressure by means of suitable valving and accordingly, it is to be appreciated that the fluid motor 86 is of the double-acting type.

A pulley wheel 98 is journalled between the legs of a U-shaped bracket 100 carried by the side of the tubular guide 34 remote from the fluid motor 86 and the end of the tension member remote from the transverse shaft 78 is trained about the pulley wheel 98 and is secured to one end of an expansion spring 102 whose other end is anchored to the wall 26.

The top wall 38 of the tubular guide 34 has an elongated spring member 106 secured thereto in any convenient manner such as by welding 108. The spring member extends longitudinally of the tubular guide 34 and welding 108 secures its front end to the tubular guide 34. The rear end of the spring member 104 is provided with a depending latch member 110 and from the phantom line position illustrated in FIG. 2 of the drawings it may be seen that the rear end of the spring member 106 may be deflected upwardly out of alignment with the rear end of the tubular guide 34 and the upper portion of the opening 36.

In operation, assuming that the hitch 10 has its component parts positioned as illustrated in FIG. 3 of the drawings, when it is desired to couple a vehicle to be towed to the hitch element 72, the rear end of the spring member 106 is deflected upwardly to the phantom line position thereof illustrated in FIG. 2 of the drawings so as to elevate the latch member 110 above the rear end 54 of the tension member 50. Then, the fluid motor 86 may be actuated to extend the tension member 50 rearwardly from the position thereof illustrated in FIG. 3 of the drawings to the positions thereof illustrated in FIGS. 1 and 2 of the drawings. Of course, when the tension member 50 is thus positioned, the rear end 54 thereof may be readily shifted between the phantom line positions thereof illustrated in FIGS. 1 and 2 of the drawings so as to position the hitch element 72 properly relative to the vehicle which is to be towed allowing the latter to be coupled to the hitch element. After the vehicle to be towed has been coupled to the hitch element 72, the fluid motor 86 is then operated in reverse so as to draw the tension member 50 forwardly whereupon the undersurface of the rear end 54 of the tension member 50 will roll over the roller 32 and final movement of the tension member 50 toward its forwardmost position will cause the cam surfaces 74 to engage the inside surfaces of the rear ends of the side walls 42 and 44 so as to swing the rear end 54 into proper longitudinal alignment with the front end 52. Also, final movement of the tension member 50 to its forwardmost position will cause the cam surface 70 to cam the latch member 110 upwardly to the phantom line position thereof illustrated in FIG. 2 of the drawings. As the tension member 50 reaches its forwardmost position, the latch member 110 will drop downwardly behind the upper portion of the rear end 54 so as to lock the tension member 50 in its forwardly disposed position.

It will of course be noted that the opposite side surfaces of the rear end portion 54 will also act as guiding surfaces coacting with the inside surfaces of the rear ends of the side walls 42 and 44 to partially center the hitch element 72 prior to the cam surfaces 74 engaging the inside surfaces of the rear ends of the side walls 42 and 44 upon final movement of the tension member 50 to its forwardmost position.

The spring 102 and tension member 82 as well as the pulley wheel 98 are not required. However, in case the fluid motor 86 is not fully actuated to shift the tension member 50 forwardly when the hitch 10 is not being used, the spring 102 will ensure that the tension member 50 is urged toward its forwardmost position so that the latch member 110 may lock the tension member 50 in its forwardmost position. Further, should the fluid motor 86 be extended slightly too far during initial steps to couple a vehicle to be towed to the hitch element and it becomes necessary to only slightly forwardly shift the tension member 50 in order to properly align the hitch element 72 with the corresponding hitch component of the vehicle to be towed, it is not necessary to pump fluid into the fluid motor through the rearmost line 96 but only necessary to vent the forwardmost fluid line 96 to the associated fluid reservoir whereby the spring 102 will then be free to slowly urge the tension member 50 forwardly as fluid is being expelled from the fluid motor 86.

It is also to be appreciated that the fluid motor 86 may be readily actuated by any suitable source of fluid under pressure such as a power take-off driven hydraulic pump or a conventional power steering unit of the towing vehicle to which the hitch 10 is secured.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an elongated tubular guide including front and rear ends and adapted for support, in longitudinal disposition, from the rear of a towing vehicle with the rear end of the guide opening outwardly of the rear end of the vehicle, an elongated tension member including rigid front and rear sections swivelly joined together at adjacent ends and slidable longitudinally within said guide between a forward position with the rear section projecting only slightly rearwardly from the rear end of the guide and guided by said tubular guide against lateral movement in all directions relative to said guide and a rearward position with at least all but the forward terminal end of the rear section projecting rearwardly from the guide for at least limited lateral movement in all directions relative to said guide.

2. The combination of claim 1 wherein the rear end of said rear section and the rear end of said guide include coacting cam surfaces operable to automatically cam the rear end portion into position with the rear section aligned with the front section upon shifting of said tension member from said rearward position toward said forward position.

3. The combination of claim 1 wherein said guide and said tension member include coacting releasable latch means operative to automatically lock said tension member in said forward position upon shifting of said tension member from said rearward position to said forward position.

4. The combination of claim 1 including motor means operatively connected between said guide and said tension member for shifting said tension member to said forward position.

5. In combination, an elongated guide including front and rear ends and adapted for support, in longitudinal disposition from the rear of a towing vehicle with a rear end of the guide disposed adjacent the rear end of the vehicle, a follower section supported from said guide for guided movement therealong, an elongated rigid tension member section including front and rear ends and also guidingly supported from said guide for movement therealong and having its front end universally secured to said follower section, said follower and tension member sections being shiftable longitudinally of said guide between a forward position with the tension member section projecting only slightly rearwardly of said guide and guided by the latter against lateral movement in all directions relative to said guide and a rearward position with at least all but the forward end of said tension member section projecting rearwardly from the guide for at least limited lateral movement in all directions relative to said guide.

6. The combination of claim 5 wherein said guide and said tension member section include coacting releasable latch means operative to automatically lock said tension member section in said forward position upon shifting of said tension member section from said rearward position to said forward position.

7. The combination of claim 6 wherein said guide is tubular and said tension member section is telescopingly and slidingly disposed therein.

8. The combination of claim 1 including a horizontal roller journalled for rotation about a horizontal transverse axis and disposed slightly rearwardly of said guide and below the undersurface portions of said tension member engageable by and for support of the rear section from beneath during its shifting relative to said guide.

9. The combination of claim 1 wherein said front section includes roller means rollingly engaged with said guide during shifting of said front section relative to said guide.

10. The combination of claim 5 wherein the rear end of said guide includes a horizontally disposed journalled roller with whose upper peripheral portion of the undersurface of said tension member section is rollingly engaged.

11. The combination of claim 5 wherein said follower section and said guide include coacting means operative to define forward and rearward limits of movement of said follower section, and thus said tension member section, relative to said guide.

References Cited

UNITED STATES PATENTS

| 3,244,434 | 4/1966 | Reed et al. | 280—482 X |
| 3,329,445 | 7/1967 | Carson. | |
| 3,391,948 | 7/1968 | McCown | 280—468 X |
| 3,437,355 | 4/1969 | Jeffes. | |

FOREIGN PATENTS 839,387    6/1960   Great Britain.

LEO FRIAGLIA, Primary Examiner